(12) United States Patent
Pettigrew et al.

(10) Patent No.: US 9,393,165 B2
(45) Date of Patent: Jul. 19, 2016

(54) METHOD FOR PRODUCING OR CALIBRATING A CONTROL PROFILE FOR A WHEELCHAIR

(71) Applicant: Dynamic Controls, Riccarton, Christchurch (NZ)

(72) Inventors: Warren Pettigrew, Christchurch (NZ); Ian Palmer, Christchurch (NZ); Gary Andrew James Dellow, Christchurch (NZ)

(73) Assignee: Dynamic Controls, Riccarton, Christchurch (NZ)

( * ) Notice: Subject to any disclaimer, the term of this patent is extended or adjusted under 35 U.S.C. 154(b) by 33 days.

(21) Appl. No.: 14/432,710

(22) PCT Filed: Sep. 9, 2014

(86) PCT No.: PCT/NZ2014/000192
§ 371 (c)(1),
(2) Date: Mar. 31, 2015

(87) PCT Pub. No.: WO2015/038008
PCT Pub. Date: Mar. 19, 2015

(65) Prior Publication Data
US 2015/0245961 A1  Sep. 3, 2015

(30) Foreign Application Priority Data

Sep. 13, 2013 (NZ) ........................................ 615505

(51) Int. Cl.
| | |
|---|---|
| *G06F 7/00* | (2006.01) |
| *A61G 5/04* | (2013.01) |
| *B60L 15/10* | (2006.01) |
| *G05B 19/042* | (2006.01) |
| *G05B 15/02* | (2006.01) |
| *A61G 5/14* | (2006.01) |

(52) U.S. Cl.
CPC *A61G 5/04* (2013.01); *A61G 5/045* (2013.01); *B60L 15/10* (2013.01); *G05B 15/02* (2013.01);

(Continued)

(58) Field of Classification Search
CPC ............ B60L 11/1824; B60L 11/1838; B60L 11/1842; B60L 3/00; G06F 7/00; A61G 5/04; G05B 15/02
USPC .................. 701/2, 22, 31.4, 33.1, 36, 41, 45; 320/108, 109, 138; 307/10.1, 65, 81; 700/22, 28, 297; 709/218
See application file for complete search history.

(56) References Cited

U.S. PATENT DOCUMENTS

| | | | |
|---|---|---|---|
| 2002/0011361 A1 | 1/2002 | Richey, II et al. | |
| 2004/0034917 A1* | 2/2004 | Noro ...................... | A47K 3/006 4/540 |

(Continued)

FOREIGN PATENT DOCUMENTS

| | | |
|---|---|---|
| AU | 2013 211 496 | 8/2013 |
| CA | 2 858 951 | 3/2007 |
| WO | WO 01/08922 | 2/2001 |

OTHER PUBLICATIONS

Gräser, Technological Solutions to Autonomous Robot Control, 1998, Internet, p. 1-7.*

(Continued)

*Primary Examiner* — McDieunel Marc
(74) *Attorney, Agent, or Firm* — Merchant & Gould P.C.

(57) ABSTRACT

A method and system for calibrating a control profile of a controller having at least one output variable used to control the operation of a mobility device. The calibration system controls the mobility device according to a prescribed routine under a range of changes of values of the output variable. One or more sensors provided, either temporarily or permanently, on the mobility device sense operational parameters of the mobility device and send sensed data to the calibration system. The calibration system determines mobility device stability associated with the changes of the at least one output variable based on the sensed data and produces a control profile that restricts a controller from outputting changes of values of the output variable associated with mobility device instability.

18 Claims, 10 Drawing Sheets

(52) U.S. Cl.
CPC .............. *G05B 19/0426* (2013.01); *A61G 5/14* (2013.01); *A61G 2203/14* (2013.01); *A61G 2203/36* (2013.01); *A61G 2203/42* (2013.01); *B60L 2200/34* (2013.01); *B60L 2240/12* (2013.01); *B60L 2240/22* (2013.01); *B60L 2240/429* (2013.01); *B60L 2250/12* (2013.01); *B60L 2250/16* (2013.01); *G05B 2219/2637* (2013.01)

(56) References Cited

U.S. PATENT DOCUMENTS

| | | | |
|---|---|---|---|
| 2004/0078888 A1* | 4/2004 | Noro | A47K 3/007 4/556 |
| 2007/0055424 A1 | 3/2007 | Peters et al. | |
| 2008/0173493 A1* | 7/2008 | Adachi | B25J 9/162 180/218 |
| 2015/0253975 A1* | 9/2015 | Pettigrew | A61G 5/04 715/772 |

OTHER PUBLICATIONS

Shibata et al., Development and Integration of Generic Components for a Teachable Vision Based Mobile Robot, 1996, IEEE, p. 230-236.*
International Search Report and Written Opinion for International Application No. PCT/NZ2013/000192 mailed Feb. 23, 2015 (11 pages).
International Search Report for International Application No. PCT/NZ2013/000192 mailed Feb. 23, 2015 (4 pages).

* cited by examiner

METHOD FOR PRODUCING OR CALIBRATING A CONTROL PROFILE FOR A WHEELCHAIR

This application is a National Stage Application of PCT/NZ2013/000192, filed 9 Sep. 2014, which claims benefit of Serial No. 615505, filed 13 Sep. 2013 in New Zealand and which applications are incorporated herein by reference. To the extent appropriate, a claim of priority is made to each of the above disclosed applications.

FIELD OF THE INVENTION

The invention relates to mobility devices. In particular, the invention relates to methods for calibrating controllers for powered mobility devices.

BACKGROUND TO THE INVENTION

Mobility devices, which include but are not limited to powered wheelchairs and mobility scooters, are an important tool for those with impaired mobility. It is common to provide mobility devices with powered operations to minimise the manual input required from a user. This is especially important in the case of users whose impairment may prevent them from manually operating the mobility device.

Such powered operations may include a traction motor (or similar) to move the mobility device. Another powered operation may be manipulating the position of parts of the seats, for example, adjusting the inclination of the back of the seat of the mobility device.

Mobility devices may incorporate electronic controllers to convert speed and direction commands into voltage to power the electric motors. Such controllers are controlled by users via a user input devices (such as a joystick). Precise control of the motors is required to ensure accurate velocity and steering of the mobility device.

One problem associated with such control is that there needs to be regulation of the achievable rate of acceleration and the achievable rate of turning at various velocities. If the rate of acceleration exceeds a certain threshold (for example, when accelerating the mobility device in a forward direction or accelerating a seat back to a more vertical inclination) this can result in a 'jerk'. Not only does this affect a user's comfort, but it also could result in mobility device instability. If the rate of turning at a particular velocity exceeds a certain threshold (for example, when turning the mobility device whilst moving forward at high speeds), this may result in excessive yawing and instability. That is to say, if the mobility device is allowed to turn too suddenly there can be a resultant and undesirable instability.

A particular challenge arises for in front wheel drive mobility devices which are dynamically unstable at speed. Once the mobility device starts to yaw, inertial forces tend to increase the yawing effort in proportion to the square of the forward speed. As above, to ensure rotational stability, regulation of the controller and achievable rate of turning at various velocities is important.

It is preferable that these achievable rates are set in accordance to, and do not exceed, the particular user's driving ability. These achievable rates also need to be set in accordance with a particular user's weight and body distribution on their particular mobility device (i.e. their seating position with respect to the wheels). This calibration function is frequently performed by a therapist who may not be technically experienced.

Traditionally to calibrate the mobility device, these achievable rates are programmed into the mobility device controller by manually entering rates of turning for various velocities or joystick deflections or by manually entering rates of acceleration. This can be a tedious process and not particularly intuitive. This is exacerbated by the fact that a number of trials are required to optimise performance of the mobility device. It may not be readily apparent to the programmer (particularly where the programmer has limited previous experience) what parameters should be entered even as a starting. Further, there can be a large number of parameters that need to be programmed, and it may not be immediately apparent to the programmer that there is a mistake or flaw in the parameters as entered.

Another known option to ensure mobility device stability is to use sensors to detect instability and to use this information to limit the operation of the mobility device in some way (for example, by throttling the velocity). A problem associated with this approach is that the sensors may not detect instability before it is too late. Also, such sensors are expensive and add complexity to the mobility device and its wiring.

It is an object of the invention to provide a method for calibrating mobility devices that alleviates at least some of the problems identified above.

It is also an object of the invention to provide a method for calibrating a mobility device that does not rely on a programmer having particular expertise or previous experience, and a method that is intuitive and requiring minimal programmer input, time and cost.

Each object is to be read disjunctively with the object of at least providing the public with a useful choice.

Reference to any prior art in this specification does not constitute an admission that such prior art forms part of the common general knowledge.

SUMMARY OF THE INVENTION

In a first aspect the invention provides a system for calibrating a control profile of a controller, wherein the controller has at least one output variable used to control the operation of a mobility device, comprising a calibration system adapted to control the mobility device according to a prescribed routine, wherein the prescribed routine is configured to operate the mobility device under a range of changes of values of the output variable; and one or more sensors adapted to be provided on the mobility device to sense one or more operational parameters of the mobility device and send sensed data to the calibration system; wherein the calibration system determines mobility device stability associated with the changes of the at least one output variable based on the sensed data and produces a control profile that restricts a controller from outputting changes of values of the output variable associated with mobility device instability.

In a further aspect there is provided a method for calibrating a control profile of a controller, wherein the controller has at least one output variable used to control the operation of a mobility device, comprising: temporarily providing sensors on the mobility device; operating the mobility device according to a prescribed routine, wherein the prescribed routine is configured to operate the mobility device under a range of values of the output variable; using sensed data from the sensors to determine mobility device stability associated with the output variable; producing a control profile that restricts the controller from outputting values of the output variable associated with mobility device instability; and removing the sensors from the mobility device.

In another aspect the invention provides a system for calibrating a control profile of a controller, wherein the controller has at least one output variable used to control the operation of a mobility device, comprising: sensors adapted to be temporarily provided on the mobility device; a first system adapted to control the mobility device according to a prescribed routine, wherein the prescribed routine is configured to operate the mobility device under a range of values of the output variable; a second system adapted to use sensed data from the sensors to determine mobility device stability associated with the output variable; and a third system adapted to producing a control profile that restricts the controller from outputting values of the output variable associated with mobility device instability.

In a further aspect the invention provides a method for calibrating a control profile of a controller, wherein the controller has an output variable used to control the operation of a mobility device, comprising: temporarily providing sensors on the mobility device; operating the mobility device according to a prescribed routine, wherein the prescribed routine is configured to operate the mobility device under a range of changes of values of the output variable; using sensed data from the sensors to determine mobility device stability associated with the changes of values of the output variable; producing a control profile that restricts the controller from outputting changes of values of the output variable associated with mobility device instability; and removing the sensors from the mobility device.

In a yet further aspect the invention provides a system for calibrating a control profile of a controller, wherein the controller has at least one output variable used to control the operation of a mobility device, comprising: sensors adapted to be temporarily provided on the mobility device; a first system adapted to control the mobility device according to a prescribed routine, wherein the prescribed routine is configured to operate the mobility device under a range of changes of values of the output variable; a second system adapted to use sensed data from the sensors to determine mobility device stability associated with the changes of output variable; and a third system adapted to producing a control profile that restricts the controller from outputting changes of values of the output variable associated with mobility device instability.

BRIEF DESCRIPTION OF THE DRAWINGS

The invention will now be described by way of example only, with reference to the accompanying drawings, in which.

DETAILED DESCRIPTION

Before describing the method of the present invention, it is helpful to first look at mobility devices in general. A mobility device may include any type of powered device that aids a user in some way, particularly a powered device that assists with movement. In one embodiment of the present invention a mobility device may be a powered wheelchair or a mobility scooter. Without limiting the scope of the invention, the remainder of this description will describe the methods of the present invention with respect to a powered wheelchair. Those skilled in the art will appreciate how the invention can be made to be applied to any suitable mobility device such as a mobility scooter.

Further it will be appreciated that the methods described below may be performed, where necessary, by any suitable person. Such a person may be the wheelchair's user (i.e. the person who will ultimately use the wheelchair), an attendant, a therapist or any other person. Without limiting the scope of the invention, the remainder of this description will describe the methods as being performed by a user. Those skilled in the will appreciate where actions may also be performed by persons other than the user.

Figure 1A:
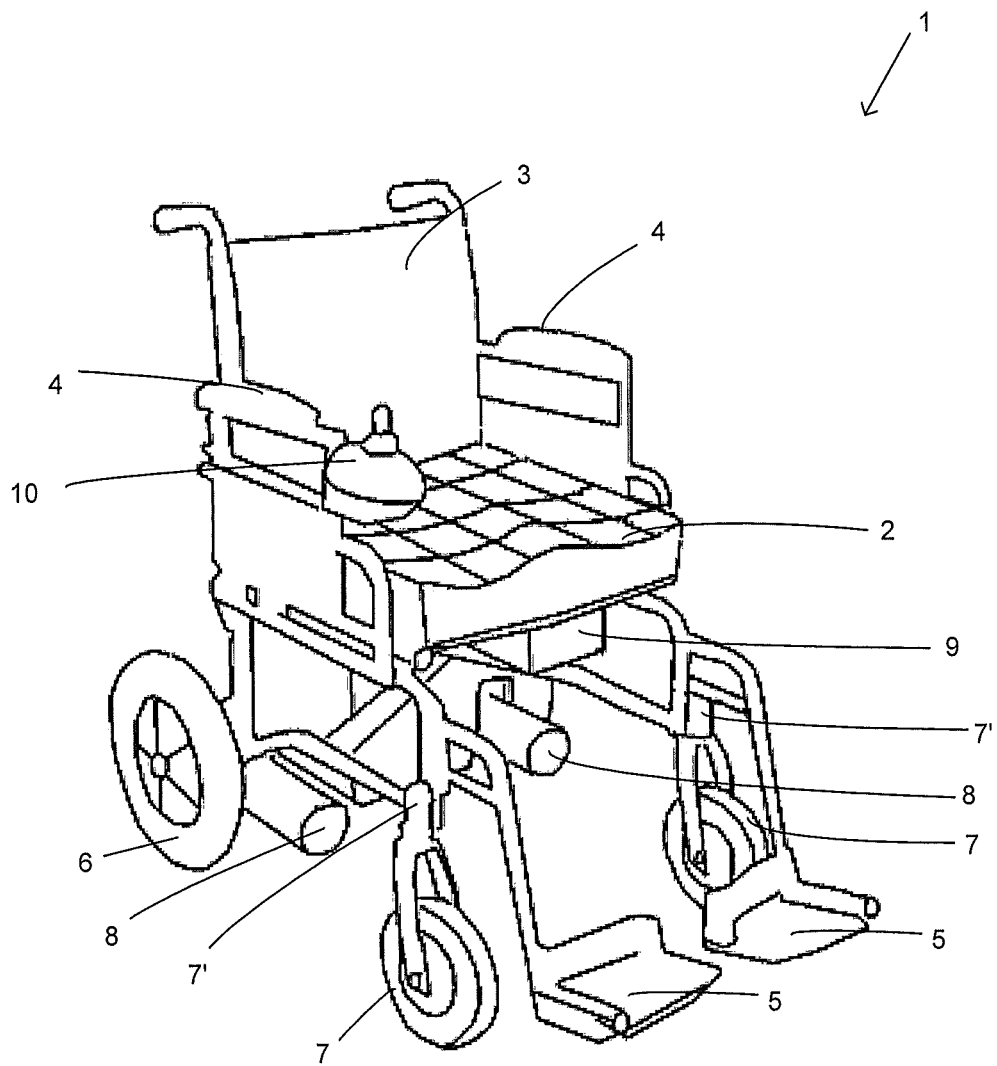
FIG. 1A shows a perspective view of a powered wheelchair.

Referring to FIG. 1, there is shown a powered wheelchair 1. The powered wheelchair includes a seat 2, a back 3, armrests 4 and footrests 5. The seat, back and footrest may be adjustable in some way as will be described in more detail below. The powered wheelchair also includes rear wheels 6 and front wheels 7. Though in this embodiment, there are a total of four wheels, other configurations are possible and consistent with the invention. The size, diameter and type of wheel will depend on the particular requirements of the user and the invention is not limited in this respect.

In the powered wheelchair 1, the rear wheels are connected to two motors 8. Therefore, the powered wheelchair of FIG. 1 is 'rear-wheel drive'. The front wheels are each free to rotate about castors 7'. To turn the wheelchair, the motors are adapted to apply a differential rotation to each rear wheel and thus achieve turning. Those skilled in the art will appreciate how motors may be adapted to achieve this, and the invention is not limited in this respect. In another possible embodiment, one set of wheels (whether connected to motor or not) may be turned through some other suitable steering mechanism. In another possible embodiment, the powered wheelchair may be 'front-wheel drive', with the motor connected to the front wheels.

The motors 8 may be traction motors, actuator motors or any other suitable motors. The motors are connected to a controller 9. The controller may be any suitable electronics adapted to control aspects of the operation of the powered wheelchair 1. In more complex wheelchairs, the controller may be a computer able to perform complex calculations and the like. There may also be more than one controller. For the sake of simplicity, this description will refer to one centralised controller, however those skilled in the art will appreciate that other controller configurations are possible. The controller generates variable outputs that control the operation of the powered wheelchair in some way. For example, the controller may output an instruction to the motor about a required velocity or to adjust the position of a part of the wheelchair. The controller may be adapted to connect to a suitable programming tool (not shown), such as an external computer or portable device. The controller may be configured to connect to the suitable programming tool using any wired or wireless connection technology. As will be discussed in more detail later, the programming tool allows a user to calibrate the controller, and thus calibrate the operation of the powered wheelchair. This is achieved by calibrating a so-called control profile that regulates the controller.

The controller 9 is connected to a user input device 10. The user input device is any device by which a user may control the controller, and thus control the operation of the mobility device. The user input device may be a joystick (as shown in FIG. 1), a switch or switch array, a pneumatic device, a keypad, or any other suitable interface between the user and the controller. The user input device may include a display screen (not shown), enabling a user to see information about the powered wheelchair or to program the controller. The display screen may be a touchscreen.

The powered wheelchair 1 of FIG. 1 may also include any number of suitable sensors (not shown). Such sensors may include temperature sensors, current sensors, accelerometers and gyroscopes. As will be discussed in more detail later, these sensors may be either permanently or temporarily attached on the powered wheelchair. The powered wheelchair may be suitably adapted to have sensors attached, whether permanently or temporarily.

As mentioned earlier, the position of parts of the wheelchair may be adjustable. For example, the height and inclination of the seat, the inclination of the back, the height of the armrests and the height of the footrests may be adjusted. In more complex wheelchair designs, there may be even more parts of the wheelchair whose position can be adjusted and with more degrees of freedom of movement. This allows a wheelchair to be customised to the needs and body of a specific user. Without limiting the possibilities, other wheelchair parts that may possibly be adjustable include: ride height, arm rest inclination, lumbar support position, headrest position and seat width. Depending on the particular wheelchair configuration, these parts may be adjusted manually or electronically or both. Electronically adjustable parts may be preferable for those users who lack the ability to adjust parts manually. The particular positioning mechanism for moving the parts is dependant on the part and how it is to be moved. For example, back inclination may be adjusted by controlling an actuator connected to a pivot (not shown) or the height of the seat may be adjusted by controlling the fluid in piston. The positioning mechanism may be connected to the controller 9. A user may use the user input device 10 to instruct the controller to control the particular positioning mechanism to adjust the position of the particular part.

Figure 1B:
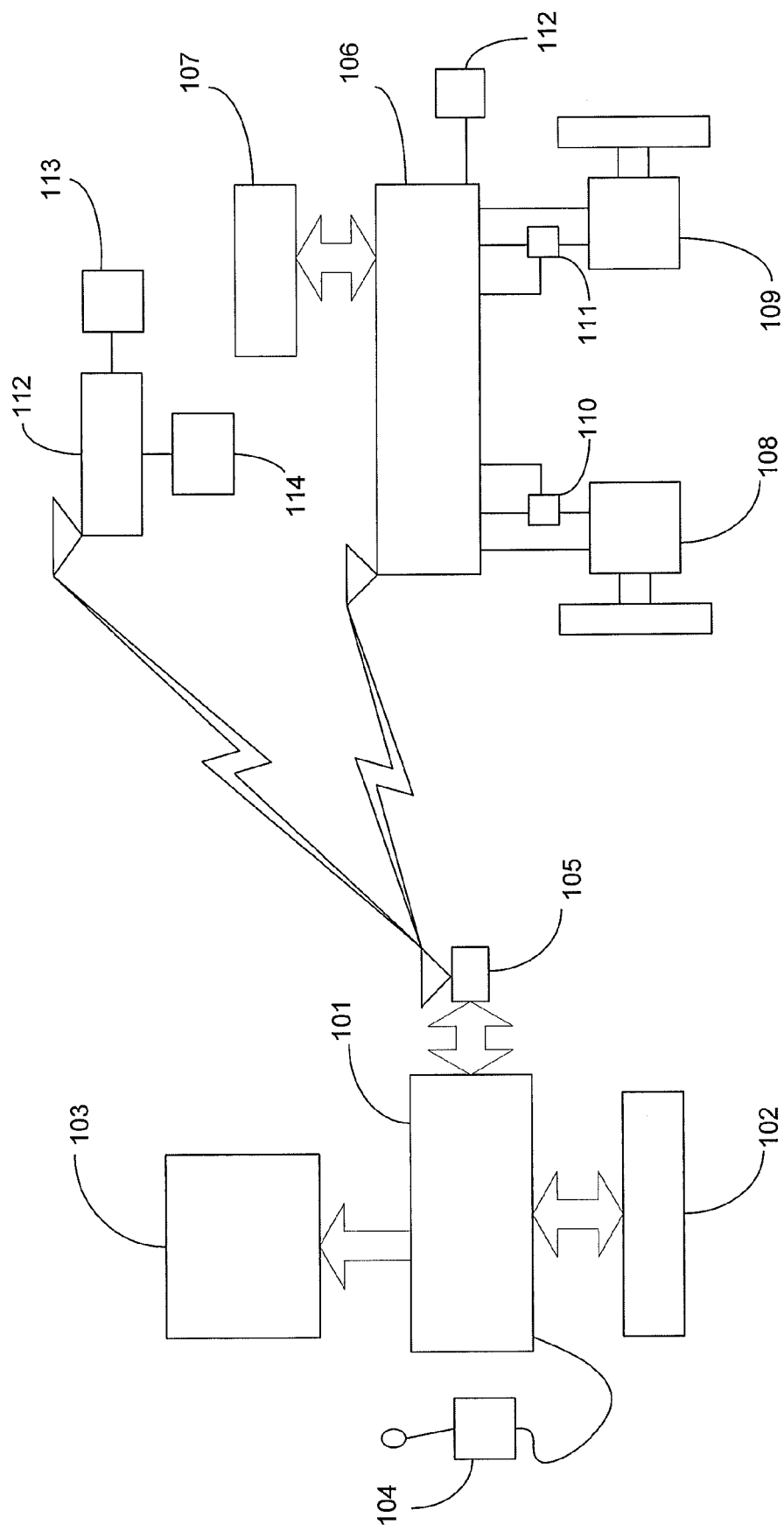
FIG. 1B shows a calibration system according to one embodiment.

Referring to FIG. 1B an exemplary calibration system for calibrating a control profile for a controller of a mobility device will be described. In this example the calibration system includes a processor 101, memory 102 (which stores prescribed test operating routines for the mobility device and profile information), an input device 104 (shown as a joystick but could be in the form of a mouse, keyboard etc.) and a communication device 105 (shown in this case as a wireless link but could be wired or wireless or a combination of wired and wireless links).

In this example the calibration system includes a portable sensing unit including an accelerometer 113 and a gyroscope 114 which communicate sensed data via a wired or wireless link to processor 101. It should be understood that accelerometers may be configured as tilt sensors. A more minimal system may only include one of these sensors. The communication link could be a wired link either to processor 101 or to mobility device controller 106 (which could communicate all information to processor 101). This portable sensing unit may be placed on or secured to a mobility device during testing and then be removed.

In this example certain sensors are integrated with controller 106. A current sensor 110 monitors the current supplied to motor 108 and current sensor 111 monitors the current supplied to motor 109. Both current sensors supply the sensed current information to controller 106. Sensor 112 (which may be a plurality of sensors) provides information as to the configuration of the mobility device (e.g. seat height etc.) to controller 106. Sensors for monitoring the speed of the mobility device or rate of turning may be incorporated into controller 106 or provided as discrete sensors.

Where it is cost effective or the mobility device may utilise information from the accelerometer or gyroscope during normal operation one or both of these sensors may be incorporated into the controller.

When a profile has been developed for the mobility device by the calibration system it may be transferred from the calibration system and stored in memory 107 of controller 106 and utilised to ensure that operation of the mobility device remains within prescribed limits.

One aspect of the present invention is concerned with a method for calibrating a control profile, and thus calibrating a powered wheelchair. Before describing this method, it is helpful to first look at a control profile in general.

Figure 2:
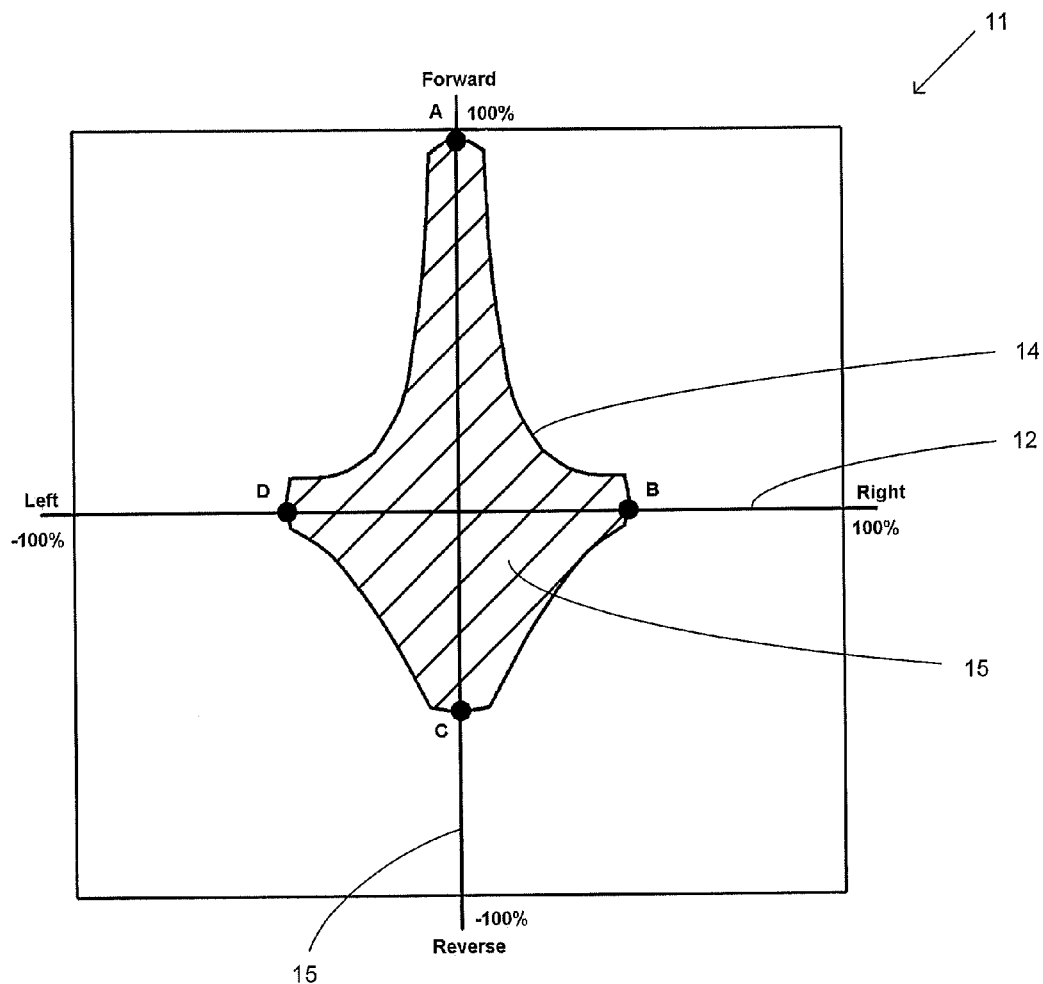
FIG. 2 shows a graphical representation of a control profile.

Referring to FIG. 2, there is shown a control profile 11 in graphical form. In this particular embodiment, the control profile shows the relationship between two variables of the wheelchair, namely rate of turning 12 on the horizontal axis and velocity 13 on the vertical axis. For a powered wheelchair, rate of turning may be considered to refer to the rotational velocity of the wheelchair about a vertical axis of the wheelchair and velocity may be considered to refer to the forward or reverse speeds of the wheelchair. Thus, as will be appreciated by those skilled in the art, when the controller controls the motor to combine a non-zero rate of turning with a non-zero velocity, the wheelchair will move in a curved path.

The control profile includes a bound 14 on the relationship between the rate of turning and the velocity. When the control profile is loaded onto a controller, the bound effectively acts as a limit on the controller, restricting the controller from outputting variables that fall outside the bound. In this way, the control profile serves to calibrate the controller, and thus calibrate the powered wheelchair. Therefore, referring to control profile 11, the controller is calibrated to be restricted to combinations of velocity and rate of turning inside the bound 14. As can be seen, the bound on the relationship between the two variables is not straightforward, with the control profile needing to require a sharp reduction in the maximum velocity for any significant rate of turning.

In the control profile 11 of FIG. 2, the bound is a closed curve that defines an area 15. In this way, the relationship between the two variables is a one-to-many relationship. Therefore, for a certain velocity, there is a range of 'allowed' rates of turning. Similarly, for a certain rate of turning, there is a range of 'allowed' velocities. In other embodiments, the bound may not be a closed curve, and therefore not define an area. In this scenario, the relationship between the two variables may be a one-to-one relationship. For example, it may be possible to produce a control profile for velocity and time, allowing the regulation of acceleration.

Though the above control profile has been described in relation to rate of turning and velocity, it will become apparent that the control profile may be used in respect of any variables associated with the operation of the powered wheelchair. This may include:

Current provided to electronics and/or motors;
Time; or
Positions of parts of the wheelchair.

It is also possible that in addition to regulating the relationship between two variables, the control profile may regulate:

just one variable (for example, the inclination of a seat); or
the relationship between three or more variables (for example velocity, rate of turning and imposed wheelchair camber).

Figure 3:
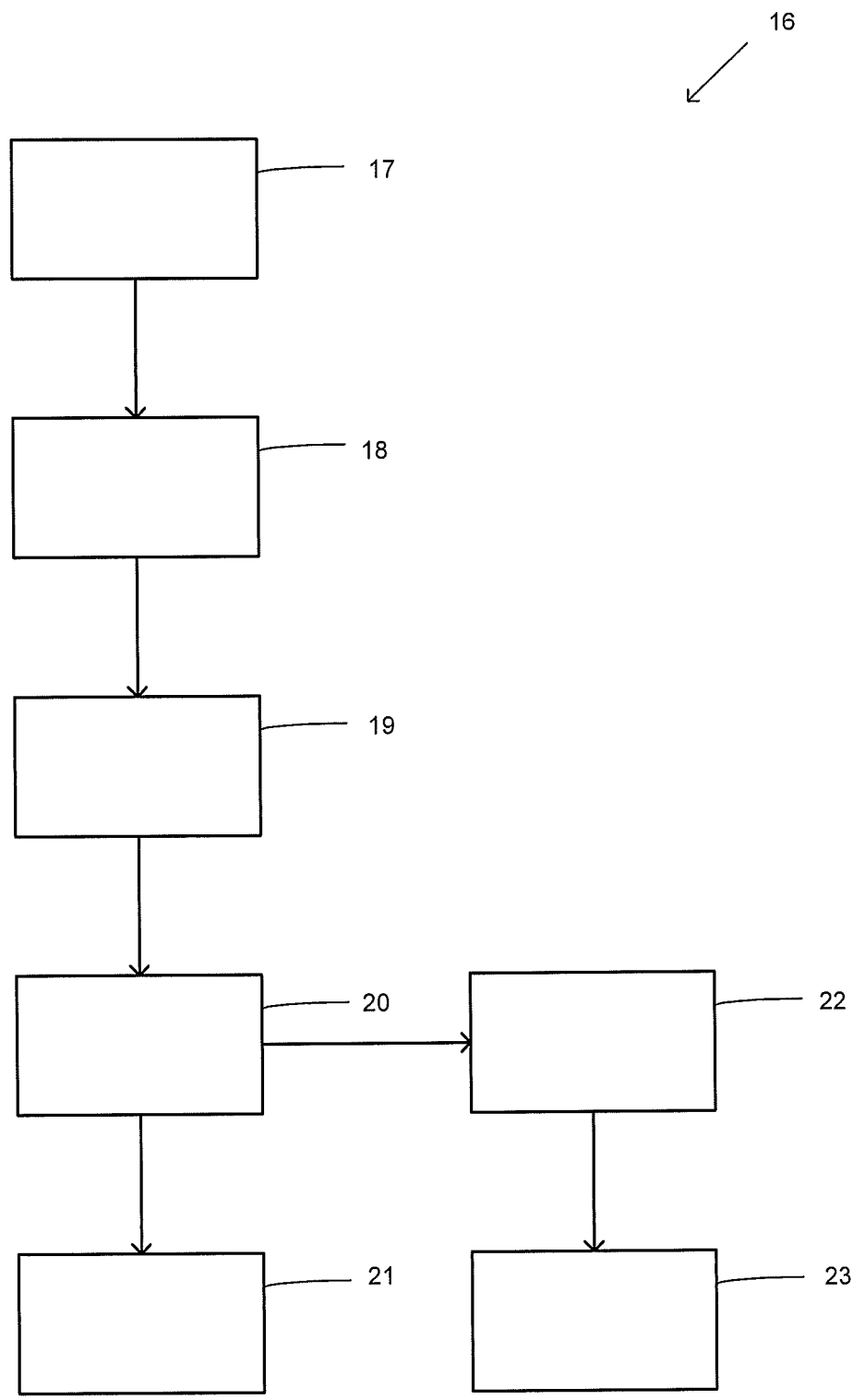
FIG. 3 shows a flowchart representing the steps for calibrating a control profile.

FIG. 3 shows a flow chart 16 representing the steps for calibrating a control profile of a controller, including:

Temporarily providing sensors to the powered wheelchair 17;
Operating the powered wheelchair according to a prescribed routine 18;
Using sensed data from the sensors to determine mobility device stability 19;
Producing a control profile 20;
Removing the sensors from the powered wheelchair 21.

Each step will be described in more detail below.

The step of temporarily providing sensors on the powered wheelchair 17 may include temporarily attaching any number of suitable sensors to the powered wheelchair. Such sensors may include gyroscopes, multi-axis accelerometers and any other sensors adapted to transform a physical property into a signal (for example, GPS). The sensors may be provided in positions on the wheelchair suitable for the sensor to sense the data that the sensor is intended to capture. The sensors are provided on the wheelchair temporarily using any suitable attachment system and the invention is not limited in this respect. This may include temporary adhesive, ties or simply placing the sensor on the wheelchair. In one embodiment, the wheelchair may be specifically adapted to receive the sensors, for example housings into which the sensors may be temporarily placed. Those skilled in the art will appreciate that depending on the type of sensor, it is important that it is well-fixed to the wheelchair so that it can accurately sense data about the wheelchair as well as prevent damage to the sensor during the rigours of testing. Since the sensors are temporary, it is not necessary that they are fully hidden or out of the way from the ultimate user. This alleviates the problem associated with permanent sensors wiring of having to incorporate them into the wheelchair's overall design.

The sensors may be adapted to establish connections with other sensors provided on the chair by any suitable wired or wireless connection. The sensors may also be adapted to connect with the controller on the wheelchair. The sensors may be adapted to store sensed data within the sensor itself, which can then later be uploaded via any suitable wired or wireless connection to a suitable system (such as a computer or portable device). Alternatively, the sensed data may immediately be transferred to a computing tool, for example via a wired connection to the controller or a wireless connection to a portable device.

Operating the powered wheelchair according to a prescribed routine 18 includes using the sensors to sense data about the powered wheelchair. Depending on the type of sensor, this data may include pitch, yaw, speed and position data. If the powered wheelchair is provided with any permanent sensors, these sensors may also provide data if appropriate.

The prescribed routine is configured to operate the mobility device under a range of values of output variables. In one embodiment, the range of values of output variables may be a combination of two output variables. For example, the prescribed routine may be configured to operate the mobility device under a range of combinations of velocity and rate of turning variables output by the controller. The prescribed routine may be a predefined test course comprising a series of circular paths of varying diameters which are followed by the powered wheelchair at increasing velocities. The prescribed routine may be dynamically modified depending if instability is detected by the sensors. For example, if a certain rate of turning produces instability at a certain velocity, then the routine may be modified dynamically to skip steps that test even higher velocities for that specific rate of turning. Those skilled in the art will appreciate how other routines may be defined, and the invention is not limited in this respect.

In another embodiment, the range of values of output variables may be a range of changes of values of the output variables. For example, the prescribed routine may be configured to operate the mobility device under a range of changes of velocity or a range of changes of rate of turning variables output by the controller. In another embodiment, the prescribed routine may be configured to operate the mobility device under a range of changes of position of parts of the wheelchair (for example, changes in the inclination of the back of the seat). Again, those skilled in the art will appreciate that any number of routines can be defined for this, and the invention is not limited in this respect.

The prescribed routine may be configured to operate under various conditions. For example, the prescribed routine may be repeated on surfaces having different degrees of friction (or 'slipperiness') or on surfaces having different cambers.

To improve the accuracy of the prescribed routine, the user may sit in the powered wheelchair whilst the routine is being run. Alternatively, a dummy that replicates the user's weight and/or body position may be put into the wheelchair.

The prescribed routine may be pre-programmed into a system that is temporarily provided on the wheelchair (for example, a portable device placed onto the seat of the wheelchair). This system may be adapted to suitably connect with the controller and or the sensors, and thus the system may be able to effect the prescribed routine and collect the sensed data. Alternatively, the prescribed routine may be pre-programmed into the controller. To execute the routine, a user may select to 'start' the routine, which may for example be provided as an option on the user input device. Alternatively, the user may be able to start the routine remotely, for example with a remote that wirelessly connects with the computing tool. Similarly, there may be a stop option.

After the routine has been executed the collected data is analysed to determine wheelchair stability 19. The data may be analysed by a suitable system such as the controller, or some other computer or portable device. As described above the sensed data is transferred from the sensors using any suitable connection means. The sensed data may include data from permanent sensors as well as the temporary sensors. If the data has been saved to the controller it may be transferred to the computing tool. The analysis of the sensed data depends upon the output variables that were being tested by the prescribed routine.

In one embodiment, where the output variables being tested are velocity and rate of turning, the sensed data may be analysed to determine where the demanded rate of turning (i.e. the rate of turning output by the controller during the prescribed routine) matches the sensed rate of turning. If the sensed rate of turning exceeds the demanded rate of turning at a certain velocity, then this may indicate a tendency of the powered wheelchair to be in a dynamically unstable state. By analysing the whole set of data using suitable software, the analysing tool is able to determine which combinations of velocity and rate and turning are unstable.

In another embodiment, where the output variable being tested is the change in velocity, the sensed data may be analysed to determine when the differential of the rate of change of velocity (i.e. linear acceleration) exceeds a predetermined threshold. If the threshold is exceeded, this suggests that for that rate of change of velocity, there may be resultant jerking i.e. instability.

In another embodiment, where the output variable being tested is the change in rate of turning, the sensed data may be analysed to determine when the differential of the rate of change of rate of turning (i.e. rotational acceleration) exceeds a predetermined threshold. If the threshold is exceeded, this suggests that for that rate of change of rate of turning, there may be resultant jerking.

In another embodiment, where the output variable being tested is the change in the position of a part of the wheelchair, the sensed data may be analysed to determine when the differential of the rate of change of the part (i.e. acceleration) exceeds a predetermined threshold. If the threshold is exceeded, this suggests that for that rate of change of position, there may be resultant jerking.

Having determined the stability from the sensed data, a control profile is produced 20. In one embodiment, the control profile is created by a user according to the method described in more detail below. In another embodiment, the control profile may be produced by suitable software on the computing tool. The software is configured to map those output variables (or combinations of output variables or changes of output variables as the case may be) which were determined not to result in instability to the control profile. That is to say, the bounds of the control profile are automatically selected so as to not overlap with the area of instability. Thus, a control profile is automatically produced that, when used in the wheelchair, will restrict the controller from outputting values of the output variables that may produce vehicle instability. In this way, the control profile is calibrated.

In one embodiment, the control profile may be produced so as to include a safety margin so that even under various normal operating conditions, the controller will be restricted from outputting values of output variables associated with wheelchair instability. In another embodiment, where the prescribed routine has been executed for a range of conditions, separate control profiles may be produced for each condition. In another embodiment, the system may be programmed to intelligently adapt the sensed data or the produced control profile to produce control profiles for other conditions.

Once the control profile has been produced, it may be possible for a user to modify the produced control profile 22. This may be to further customise the control profile to meet the user's driving ability or any other factors. This may be done in accordance with the method described in more detail below. This modification step may be performed on the computing tool. The system may include a display screen and any suitable input device (e.g. touchscreen, mouse or keypad). The control profile may be displayed as a graphical representation (as discussed in relation to FIG. 2) or may be displayed as a series of numbers. The display screen may also display the sensed data from the execution of the prescribed routine, which may be overlaid with the graphical representation of the control profile. This enables the user to make informed decisions about any modifications to the control profile that they think necessary. The display screen may also display multiple control profiles overlaid each other with different visual representations to enable differentiation. This would allow a user to compare old and new control profiles, or to compare control profiles produced for different conditions.

Once the control profile has been finalised, it is applied to the controller 23. Applying the controller may require loading the control profile from the system onto the controller. Where the control profile was produced on the controller, it may simply require enabling the control profile in the controller. Those skilled in the art will appreciate how this step depends on the particular configuration of the controller, and the invention is not limited in these details.

In one embodiment, where there are multiple control profiles for different conditions, these may each be applied to the controller. Then in use, a permanent sensor in the powered wheelchair may detect the conditions informing the controller which control profile to implement. In another embodiment, the user may use the user input device to manually implement a specific control profile (for example, by selecting an 'uneven surface' mode).

As will be readily understood from the description above of the steps, there any number of combinations of computing tools that may be used to execute the programmed prescribed routine, collect the data, analyse the data, produce the control profile and modify the control profile. Indeed it is possible that in one embodiment, these steps may all be carried out on the controller (with a display provided on the user input device, for example). In another embodiment, these may all be carried out across multiple portable computers (such as a laptops, tablets and/or mobile phones). Those skilled in the art will appreciate how to adapt the method depending on what devices have been configured for what purpose, and the invention is not limited in this respect.

The temporary sensors are removed from the powered wheelchair 21. These sensors may then be used to calibrate another powered wheelchair. By temporarily attaching the sensors, their cost and complexity does not have to be incorporated into the wheelchair design, however a user is still able to reap the benefits of a calibration that is customised to their specific wheelchair and weight and body distribution.

Figure 4:
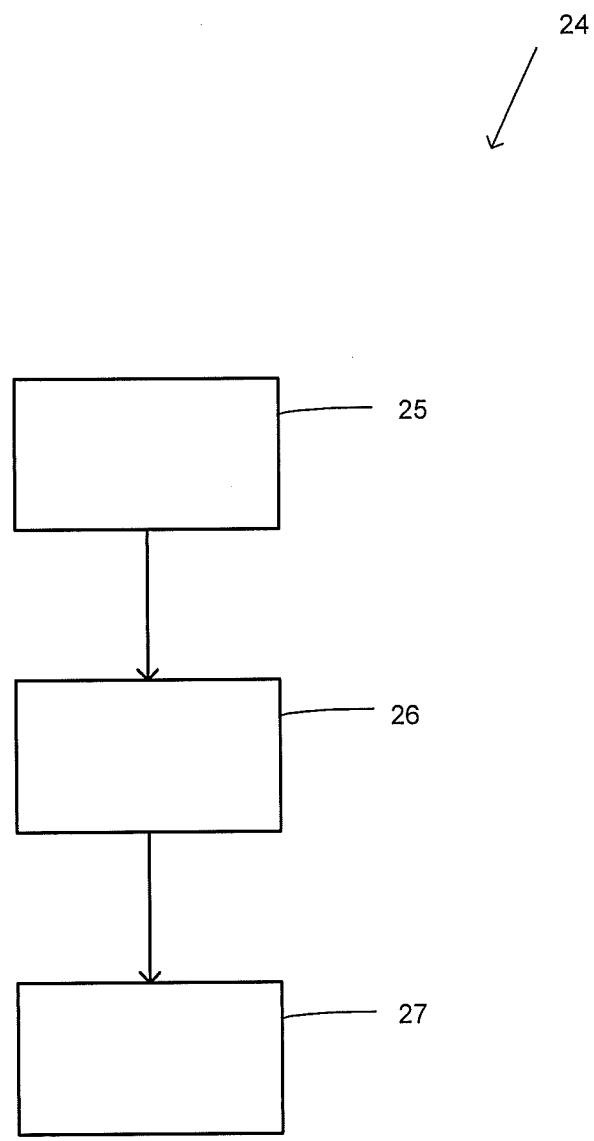
FIG. 4 shows a flowchart representing the steps for producing a control profile.

FIG. 4 shows a flow chart 24 representing the steps for producing a control profile, including:

Displaying the relationship between at least two variables associated with operating the powered wheelchair in a graphical representation 25;

Adjusting the graphical representation interactively to calibrate the relationship between the at least two variables to produce the control profile 26; and Applying the control profile to the powered wheelchair 27; Each step will be described in more detail below.

Figure 5:
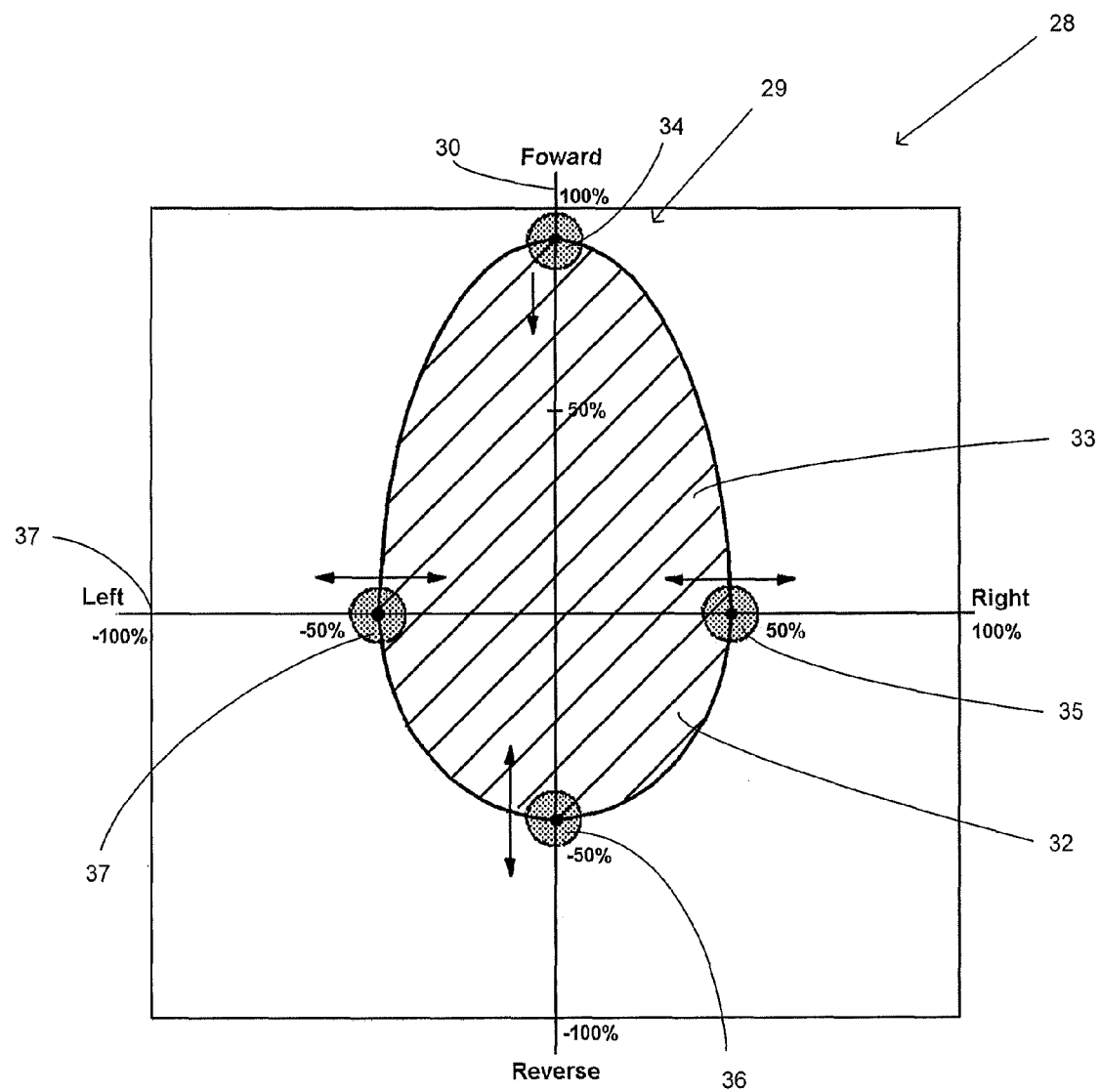
FIG. 5 shows a graphical representation of a control profile according to one embodiment.

Referring to FIG. 5, there is shown a graphical representation 28 of control profile 29 that can be calibrated according to the present invention. The graphical representation may be displayed on a screen of any suitable computing tool, such as a computer or a portable device. A user is able to interact with the graphical presentation by means of any suitable input device connected to the computing tool, such as a touchscreen or keypad. Initially, the control profile may be produced by software—the result of analysis of the sensed data from the calibrating method described above. In another embodiment, the control profile may be an existing control profile that the user wishes to modify. Such an existing control profile may be an old control profile that needs to be updated, or it may be a 'template' control profile built into the software. It is also possible that a user may create the control profile in accordance with the method described below.

As described in relation to FIG. 2, the graphical representation shows the relationship between two variables associated with the operation of a powered wheelchair. As with FIG. 2, FIG. 4 shows the relationship between velocity (on the vertical axis) 30 and rate of turning (on the horizontal axis) 31. The graphical representation shows the bound 32 of the relationship, which in FIG. 4 is shown as a closed curve. The bound defines an area 33, which represents the combinations of the two variables allowed by the control profile. The curve is related to control points 34 35 36 37 which will be discussed in more detail below. As discussed in relation to FIG. 2, the bound may be an open curve and/or the bound may define a one-to-one relationship between the two variables.

Figure 6:
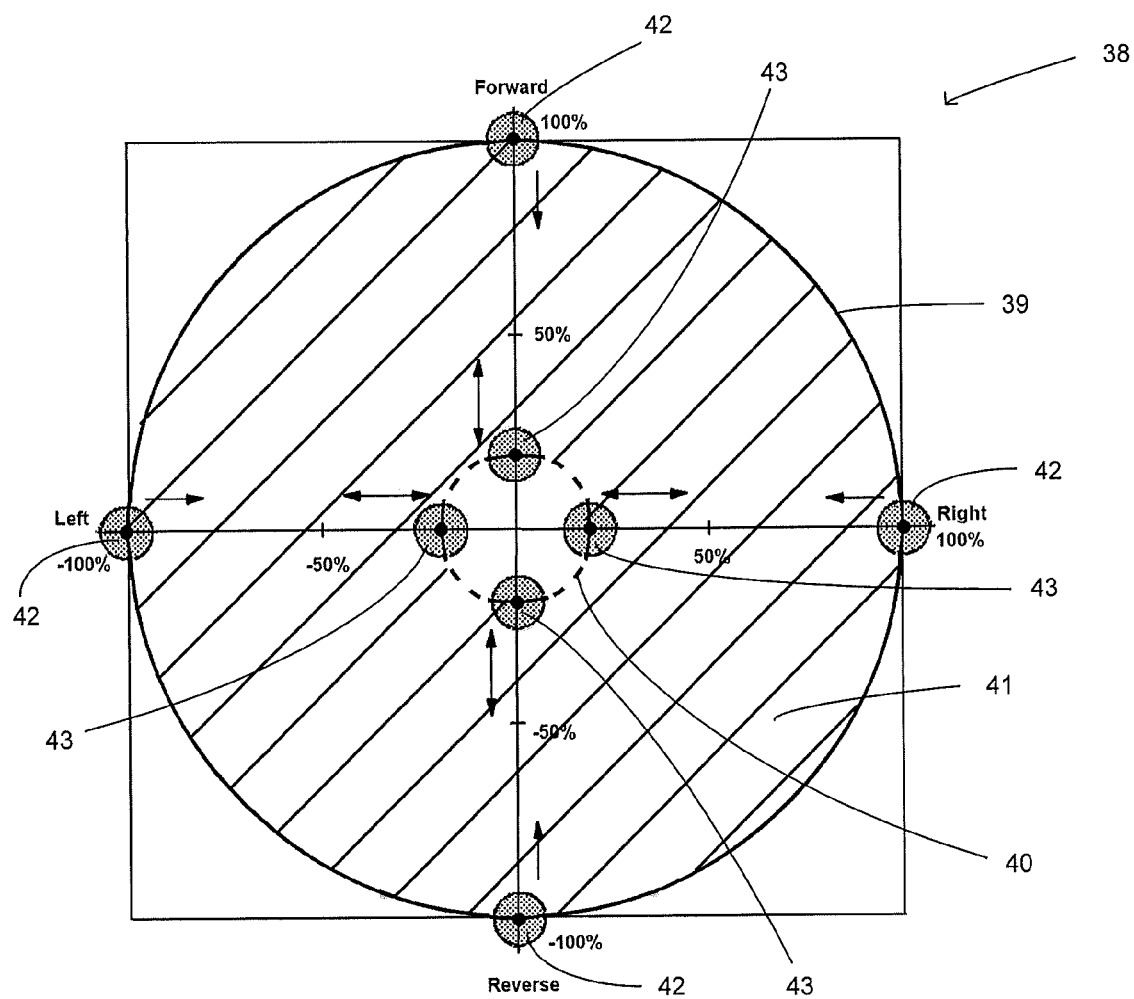
FIG. 6 shows a graphical representation of a control profile according to another embodiment.

In another embodiment, the bound may include more than one curve. FIG. 6 shows another graphical representation 38 of the relationship between velocity and rate of turning. In this embodiment, there is an outer curve 39 and an inner curve 40. Together, these curves define an area 41, which represents the combinations of the two variables allowed by the control profile. Those skilled in the art will understand that in this particular embodiment, the inner curve relates to a minimal speed required for the controller to operate the powered wheelchair. Again, the outer curve is associated to control points 42 and the inner curve is associated with control points 43.

With the relationship between the two variables displayed as a graphical representation, a user can interactively adjust the relationship by adjusting the bound. In one embodiment, the user may be able to use a suitable input device (such as a touchscreen or mouse) to manipulate the position of the bound, and thus adjust the relationship between the two variables. The user may also be able to toggle whether there are multiple curves (as in FIG. 6) and whether the area inside the bound is considered as 'allowed'.

In one embodiment, the user may be able to toggle whether the bound is symmetric about some axis. This is particularly appropriate when there is an inherent symmetry to the variables. When a bound is adjusted, the adjustment may automatically be mirrored about the selected line of symmetry. For example, in FIG. 5, the bound is symmetric about the vertical axis since the relationship between velocity and rate of turning is the same regardless of whether the turn is left or right. This may not be the case if the user's weight or seating distribution is not balanced. Conversely, the control profile is not symmetric about the horizontal axis, since forward and reverse velocities have different stabilities due the powered wheelchair being driven by either the front or rear wheels.

In one embodiment, the user may adjust the bound (and thus the relationship between the two variables), by selecting and dragging control points 34 35 36 37 that define the curve. In this way, the user can interactively adjust the relationship between the variables. The control points may define key parts of the curve and may be restricted in their allowed movement. For example, referring to FIG. 5, control point 34 defines the maximum positive velocity without turning and it's restricted to 'sliding' on the vertical axis. Control point 36 defines the maximum negative velocity without turning and is also restricted to 'sliding' on the vertical axis. Control points 33 and 35 define the maximum positive and negative rate of turning without velocity respectively. Other possible key control points include points that define the maximum rate of turning for the maximum positive or negative velocity, or the maximum velocity and the maximum positive or negative rate of turning.

Figure 7:
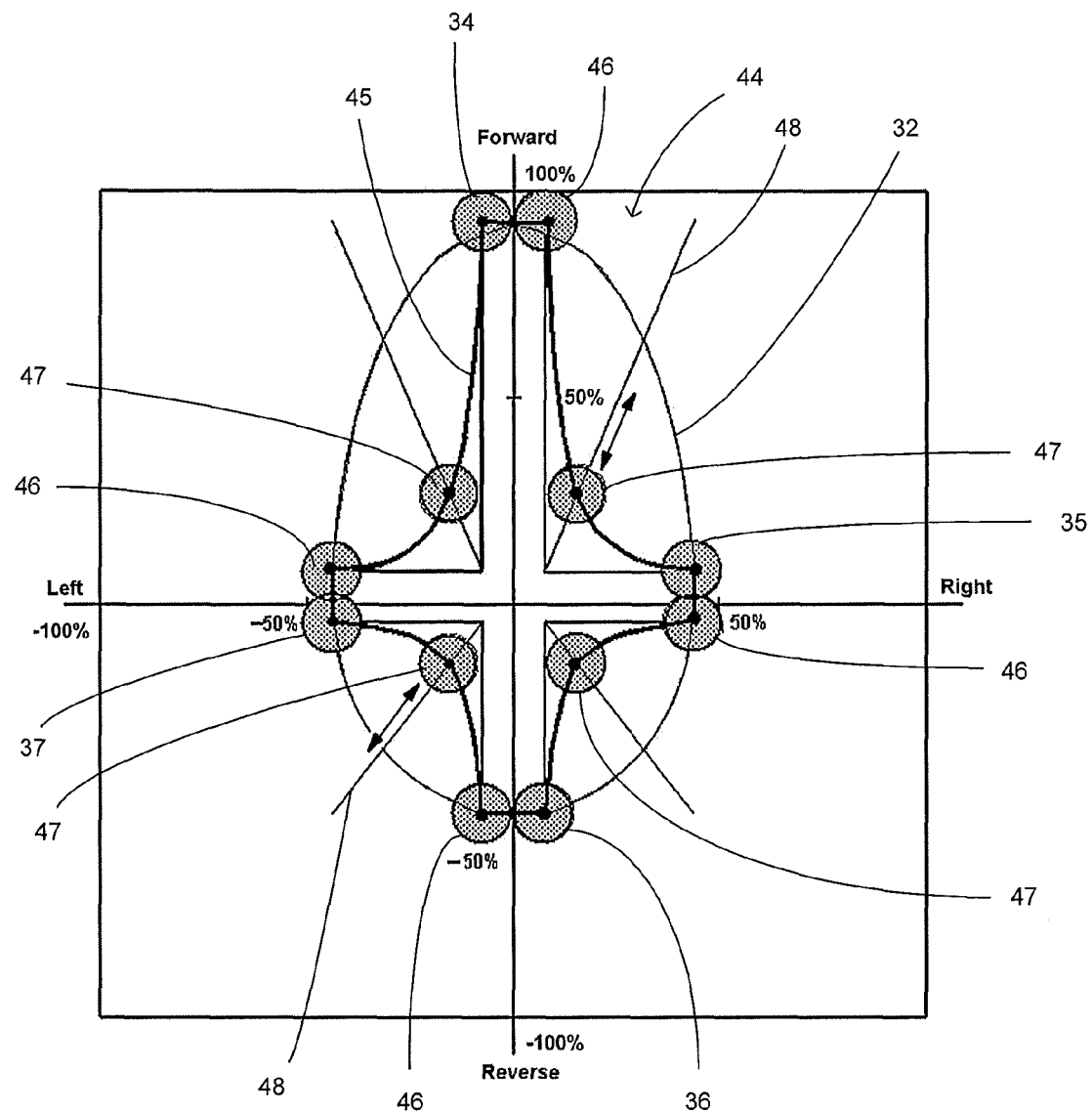
FIG. 7 shows a graphical representation of a control profile according to a further embodiment.

The user may be able to add and remove control points as necessary. Referring to FIG. 7, there is shown a graphical representation of a control profile 44. In this example, the control profile is a modification made to the control profile 29 of FIG. 2. Both are displayed allowing a user to readily see adjustments that are being made. Control profile 29 is shown by bound 32 and control profile 44 is shown by bound 45. New control points 46 47 have been added. As can be seen, the added control points allow for a more complex control profile to be produced. The control points may be free to be adjusted in any direction, or they may be restricted to movement along some path. For example, control points 47 are set to be restricted to bisecting line 48.

As mentioned earlier, the curve is defined by the control points. Those skilled in the art will appreciate that any suitable modelling method may be used to interpolate a curve between control points. For example, a straight line or a nth term polynomial (where n is at least 1) may be interpolated across the control points. The interpolation method used may depend on the variables that are subject to the control profile. The interpolation method used may also depend on particular control points themselves. This is illustrated by the control profile 44 of FIG. 7, which has a combination of both polynomial and linear curves.

As mentioned earlier in the description, control profiles may be produced for any variables associated with the operation of the powered wheelchair.

Figure 8:
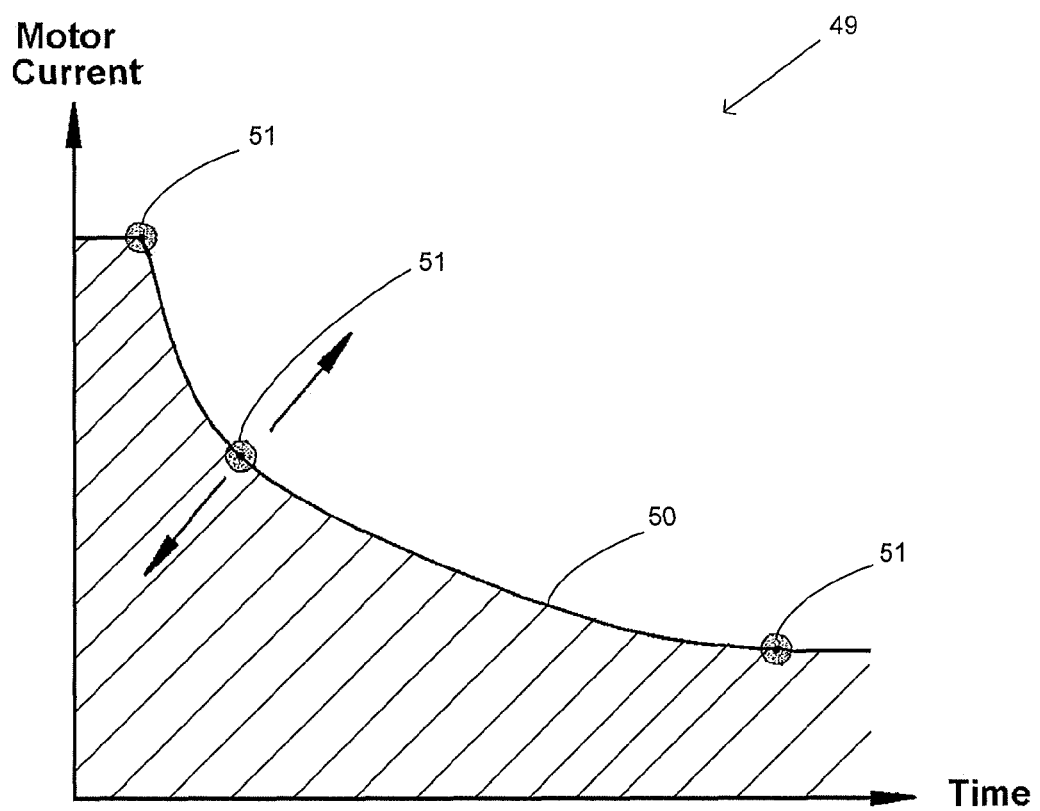
FIG. 8 shows a graphical representation of a control profile accord to a yet further embodiment.

In one embodiment, the control profile may be produced for the relationship between motor current and time. Time may be the running time of the motor. By regulating the allowable current over time, this can protect the motors thermally without having to rely on a direct temperature feedback mechanism. An example of such a control profile 49 is shown in FIG. 8. As with the control profiles discussed above, the relationship is defined by a bound 50, which in this case is the two axes and the curve, which is defined by control points 51. In this example, the current may be considered an output variable outputted by the controller (either directly or indirectly), whereas time is a variable that is measured by the controller.

Figure 9:
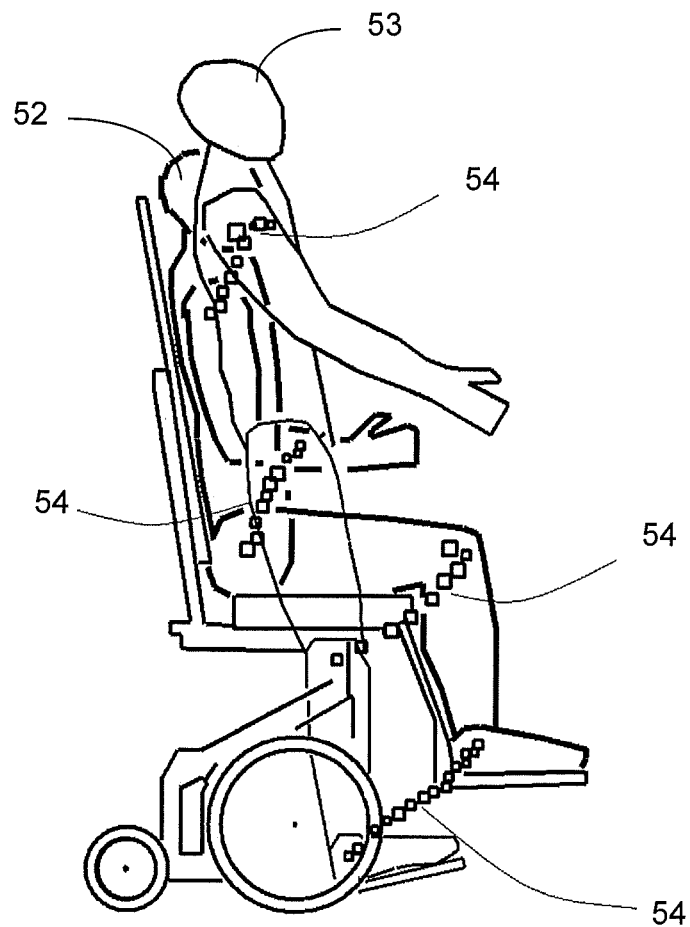
FIG. 9 shows a side view illustration a transition of a wheelchair.

As mentioned earlier in the description, it is also possible to produce control profiles for more than two variables. For example, in more complex wheelchair systems, it may be necessary to coordinate the motion between different parts of the wheelchair (for example, as a wheelchair changes from a seated configuration to a standing configuration). This type of transition is shown in FIG. 9 illustration the range of movement from a seated position 52 to a standing position 53. The movement of each part may be controlled by a suitable control profile, with the shape and timing adjusted by moving control points. The control points may either relate to hinge points 54 on the human body or hinge points in the seating system (not shown). The shape of the profiles may be adjusted to accommodate limb length or the distance between hinge points on a particular wheelchair.

Once the user has finalised the control profile, the control profile can be applied to the wheelchair 27 by loading from the system onto the controller as described earlier in relation to the calibration method. The user may also produce multiple profiles. These may be, for example, for different variables or for different operating conditions. The user may test the control to ascertain whether any further modifications need to be made. Such testing may be done in accordance with the calibration method described above.

From the above, it will be readily appreciated, that by using a graphical representation of the control profile, and by using visual cues to adjust the bound of the relationship between variables, a user may be able to produce a control profile intuitively that does not require tediously programming, traditionally done by experts.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A system for calibrating a control profile of a controller, wherein the controller has at least one output variable used to control the operation of a mobility device, comprising:
   a. a calibration system adapted to control the mobility device according to a prescribed routine, wherein the prescribed routine is configured to operate the mobility device under a range of values of the output variable; and
   b. one or more sensors adapted to be provided on the mobility device to sense one or more operational parameters of the mobility device and send sensed data to the calibration system;
   wherein the calibration system determines mobility device stability associated with the changes of the at least one output variable based on the sensed data and produces a control profile that restricts a controller from outputting changes of values of the output variable associated with mobility device instability.

2. A system as claimed in claim 1 wherein at least one sensor is an accelerometer.

3. A system as claimed in claim 2 wherein the one or more sensors are removable and separate from a mobility device controller.

4. A system as claimed in claim 3 wherein the sensors communicate with the calibration system via a wireless communications link.

5. A system as claimed in claim 3 wherein the sensors communicate with a controller of the mobility device that communicates sensed data to the calibration system.

6. A system as claimed in claim 1 wherein at least one sensor is a gyroscope.

7. A system as claimed in claim 1 including one or more sensors that sense mobility device configuration.

8. A system as claimed in claim 1 including a display for displaying a control profile and a user input device enabling a user to interactively adjust the control profile.

9. A method for calibrating a control profile of a controller, wherein the controller has at least one output variable used to control the operation of a mobility device, comprising:
   a. temporarily providing sensors on the mobility device;
   b. operating the mobility device according to a prescribed routine, wherein the prescribed routine is configured to operate the mobility device under a range of values of the output variable;
   c. using sensed data from the sensors to determine mobility device stability associated with the output variable;
   d. producing a control profile that restricts the controller from outputting values of the output variable associated with mobility device instability; and
   e. removing the sensors from the mobility device.

10. The method as claimed in claim 9, wherein the prescribed routine is configured to operate the mobility device under a range of combination of values of at least two output variables and the control profile restricts the controller from outputting combinations of values of the at least two output variables associated with mobility device instability.

11. The method as claimed in claim 9, wherein mobility device stability is determined by comparing a sensed rate of turning of the mobility device with an output variable for the rate of turning of the mobility device.

12. The method as claimed in claim 9, wherein the control profile includes bounds on the at least one output variable.

13. The method as claimed in claim 12, wherein the control profile is produced so that the bounds on the at least one output variable do not overlap with values of the at least one output variable associated with mobility device instability.

14. The method as claimed in claim 12, wherein the control profile may be modified by adjusting the bounds on the at least one output variable.

15. The method as claimed in claim 9, including operating the mobility device according to a prescribed routine under a plurality of conditions and producing control profiles for each condition.

16. The method as claimed in claim 9, including the step of loading the control profile onto the controller.

17. The method as claimed in claim 9, wherein the at least one output variable includes position of a part of the mobility device.

18. A system for calibrating a control profile of a controller, wherein the controller has at least one output variable used to control the operation of a mobility device, comprising:
   a. sensors adapted to be temporarily provided on the mobility device;
   b. a first system adapted to control the mobility device according to a prescribed routine, wherein the prescribed routine is configured to operate the mobility device under a range of values of the output variable;
   c. a second system adapted to use sensed data from the sensors to determine mobility device stability associated with the output variable; and
   d. a third system adapted to producing a control profile that restricts the controller from outputting values of the output variable associated with mobility device instability.

* * * * *